United States Patent
L'Her

(10) Patent No.: US 12,078,970 B2
(45) Date of Patent: Sep. 3, 2024

(54) METHOD AND SYSTEM FOR ESTIMATING THE DRIFT OF A CLOCK FOR DATING SEISMIC DATA SAMPLES

(71) Applicant: SERCEL, Carquefou (FR)

(72) Inventor: Christophe L'Her, Massy (FR)

(73) Assignee: SERCEL, Carquefou (FR)

( * ) Notice: Subject to any disclaimer, the term of this patent is extended or adjusted under 35 U.S.C. 154(b) by 729 days.

(21) Appl. No.: 17/255,373

(22) PCT Filed: Jun. 19, 2019

(86) PCT No.: PCT/FR2019/051506
§ 371 (c)(1),
(2) Date: Dec. 22, 2020

(87) PCT Pub. No.: WO2020/002798
PCT Pub. Date: Jan. 2, 2020

(65) Prior Publication Data
US 2021/0263477 A1   Aug. 26, 2021

(30) Foreign Application Priority Data

Jun. 29, 2018  (FR) ...................................... 1856008

(51) Int. Cl.
*G04G 3/02* (2006.01)
*G01V 1/38* (2006.01)

(52) U.S. Cl.
CPC ........ *G04G 3/02* (2013.01); *G01V 1/38* (2013.01)

(58) Field of Classification Search
CPC ......... G04G 3/02; G01V 1/38; G01V 2200/12
See application file for complete search history.

(56) References Cited

U.S. PATENT DOCUMENTS

| 9,417,359 B2 | 8/2016 | Gateman et al. |
| 9,753,164 B2 * | 9/2017 | Barakat ................... G01V 1/247 |
| 2007/0214202 A1 * | 9/2007 | Beylkin ................... G01V 1/28 |
| | | 708/290 |
| 2009/0154289 A1 * | 6/2009 | Johansen ................. G01V 1/00 |
| | | 367/21 |

(Continued)

FOREIGN PATENT DOCUMENTS

| CN | 103064109 | 4/2013 |
| CN | 103837750 | 6/2014 |

(Continued)

OTHER PUBLICATIONS

CN Office Action dated Aug. 18, 2021.
International Search Report dated Oct. 14, 2019.

*Primary Examiner* — Tung S Lau
(74) *Attorney, Agent, or Firm* — IPSILON USA, LLP

(57) ABSTRACT

The method for estimating the drift over time of a physical operating parameter of a clock for dating seismic data samples associated with a seismic data collection node involves measuring (10) at least one quantity associated with the clock, at predetermined instants or during predetermined time periods, and applying (12), to this quantity, a predetermined non-linear law of variation of this quantity that depends on the values collected during the measurement step (10), so as to obtain an estimation of the drift over time of the physical operating parameter.

15 Claims, 3 Drawing Sheets

(56) References Cited

U.S. PATENT DOCUMENTS

| | | | |
|---|---|---|---|
| 2009/0257321 A1* | 10/2009 | Scott | H03L 1/022 368/200 |
| 2010/0318299 A1 | 12/2010 | Golparian | |
| 2012/0294112 A1* | 11/2012 | Pearce | G01V 1/38 367/2 |
| 2013/0013212 A1* | 1/2013 | Hatchell | G01V 1/38 702/14 |
| 2014/0040653 A1* | 2/2014 | Etkin | G06F 1/12 713/500 |
| 2014/0043936 A1 | 2/2014 | Poole | |
| 2015/0168576 A1* | 6/2015 | Craft | G01V 1/38 702/14 |
| 2015/0219790 A1* | 8/2015 | Gateman | G01V 13/00 367/13 |
| 2016/0061972 A1 | 3/2016 | Laine | |

FOREIGN PATENT DOCUMENTS

| | | |
|---|---|---|
| CN | 106909065 | 6/2017 |
| GB | 2491103 | 11/2012 |
| WO | 2009066144 | 5/2009 |

\* cited by examiner

METHOD AND SYSTEM FOR ESTIMATING THE DRIFT OF A CLOCK FOR DATING SEISMIC DATA SAMPLES

RELATED APPLICATION

This application is a National Phase of PCT/FR2019/051506 filed on Jun. 19, 2019 which claims the benefit of priority from French Patent Application No. 18 56008, filed on Jun. 29, 2018, the entirety of which are incorporated by reference.

Field of the Invention

The present invention relates to a method and to a system for estimating the drift over time of a physical operating parameter of a clock for dating samples of seismic data.

The invention belongs to the field of marine or land-based seismic surveying and applies in particular to minimizing dating errors in collected samples of seismic data.

Description of Related Art

Any clock exhibits a certain time offset over time, which is expressed for example through an accumulated phase error, commonly called "drift". This drift is due to various factors, including the ageing of the clock or even the temperature of the environment in which it is located.

This drift affects both clocks of the type having a quartz oscillator (temperature-controlled crystal oscillators, TCXO, or microcontroller-compensated crystal oscillators, MCXO, or even oven-controlled crystal oscillators, OCXO) and (rubidium or cesium) atomic clocks.

When the clock is used to date events such as receptions of samples of seismic data, clock drift leads to errors in the dating of these samples.

Current methods for correcting clock drift are generally based on the assumption that this drift is linear, and therefore apply corrections that are themselves also linear. This is the case for example in patent document U.S. Pat. No. 9,417,359. This means that, if for example an accumulated clock phase error of 30 ms has been measured after 30 days of operation, the drift is considered to be 1 ms per day and is corrected accordingly.

However, this technique is not satisfactory, as it is observed in practice that clock drift is not linear.

Objects and Summary

The invention aims to rectify at least one of the above-mentioned drawbacks of the prior art.

For this purpose, the present invention proposes a method for estimating the drift over time of a physical operating parameter of a clock for dating samples of seismic data, associated with a seismic data collection node, in particular at sea, with a node designed to remain on a seabed.

This results in a residual clock dating error that is less than the residual error obtained when applying a linear correction to the clock drift.

Furthermore, this method may be implemented either within the seismic data collection equipment itself or in a separate computer.

Moreover, the clock drift may be estimated at any time following a seismic data collection campaign, or even during the campaign when this has a particularly lengthy duration.

In addition, if the clock is an OCXO clock, this method is robust with respect to the oven heating time of the clock.

In addition, this method may be applied indiscriminately to any type of clock, including quartz clocks (including TCXO, MCXO and OCXO) and atomic clocks (including rubidium and cesium atomic clocks).

The invention makes it possible to achieve a good-quality estimate of the clock drift, thereby making it possible to apply a relevant correction to the collected samples of seismic data.

Particular embodiments are set forth in the dependent claims.

For the same purpose as that indicated above, the present invention furthermore proposes a method for estimating the drift over time of a physical operating parameter of a clock for dating samples of seismic data, associated with a seismic data collection node, in particular at sea, with a node designed to remain on a seabed, as claimed in claim 9.

Still for the same purpose as that indicated above, the present invention also proposes a system for estimating the drift over time of a physical operating parameter of a clock for dating samples of seismic data, associated with a seismic data collection node, as claimed in claim 14.

Since the particular advantages and features of the system are similar to those of the methods, they are not recalled here.

BRIEF DESCRIPTION OF DRAWINGS

Other aspects and advantages of the invention will become apparent on reading the detailed description below of particular embodiments of the invention, given by way of wholly non-limiting examples, with reference to the appended drawings, in which.

DETAILED DESCRIPTION

In the following text, consideration is given to a seismic data collection node. These data are collected by way of various seismic sensors, including velocity sensors, accelerometers or even hydrophones and/or geophones. It is possible to associate with a given node for example three geophones, or a hydrophone and three geophones, or a hydrophone and three accelerometers, any other combination of sensors being imaginable. In particular, although the data may be collected on land or in a well, in one particular embodiment, what will be of interest is the collection of seismic data at sea, by a node that is in particular able to be placed on the seabed for a seismic campaign before being recovered.

A clock is associated with this node in order to date the samples of seismic data received by the node.

In the knowledge that, for example during a seismic data collection campaign at sea, the node may remain on the seabed for several months, the samples of seismic data are timestamped by a high-end clock that has high stability.

This clock may be a quartz oscillator clock (for example TCXO, MCXO or OCXO) or an atomic clock (for example a rubidium or cesium atomic clock). It is defined by a physical operating parameter, which may for example be its phase with respect to a reference clock, or even its instantaneous frequency.

As explained in the introduction, over time and following an initial synchronization, the clock undergoes drift that results, after a predetermined duration, in an accumulated phase error or an accumulated instantaneous frequency error.

Figure 1:
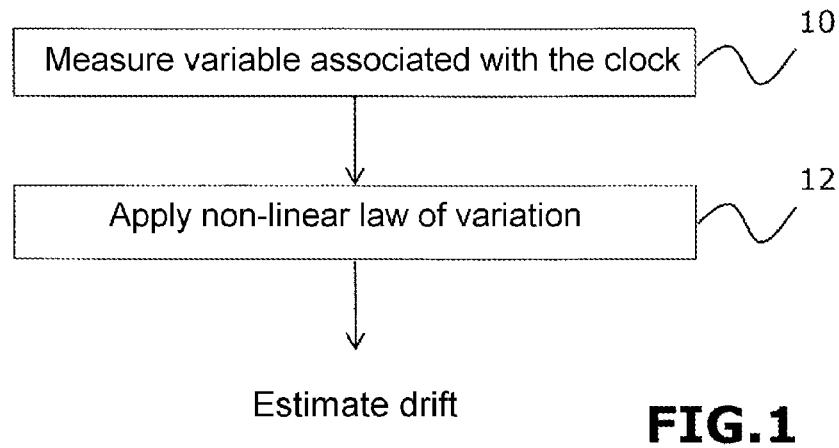
FIG. 1 is a flowchart generally illustrating steps of a method for estimating the drift over time of a physical operating parameter of a clock for dating samples of seismic data.

FIG. 1 illustrates the method for estimating this drift in accordance with the invention in general.

It comprises a step 10 of measuring a physical variable associated with the clock. This physical variable is measured, either at predetermined instants in time or for predetermined periods of time.

This measurement step 10 is followed by a step 12 in which a predetermined non-linear law of variation, and in particular a polynomial law of order greater than or equal to 2, is applied to this physical variable. This then gives an estimate of the accumulated phase error of the clock, this error being representative of the clock drift.

Two particular embodiments of this estimation method are described in detail below, depending on whether the chosen physical variable is the instantaneous frequency and/or the phase of the clock.

Figure 2:
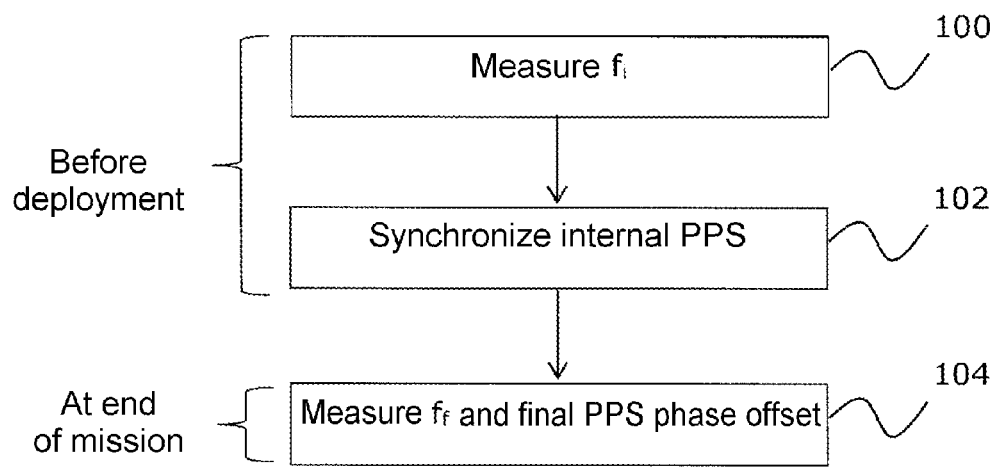
FIG. 2 is a flowchart illustrating steps of the method of FIG. 1 in a first particular embodiment in which the physical operating parameter is the instantaneous frequency of the clock.

In a first embodiment in which the instantaneous frequency and the phase of the clock are used as physical variables to be measured, the details of the measurement step 10 are illustrated in FIG. 2.

This measurement step is performed in two phases: in a first phase, which takes place before the node is deployed for a seismic data collection mission, the initial instantaneous frequency $f_i$ of the clock is measured in a step 100, and an internal time information signal of the node is synchronized with respect to a reference time information signal in a step 102.

The internal time information signal of the node is produced by the clock. It generally operates at a frequency of several MHz, for example 10 MHz, and, using a clock frequency divider, the clock also provides a signal at another frequency, for example 1 Hz, which is used as internal time information signal or PPS (pulse per second).

This internal PPS allows a microcontroller to timestamp the samples of seismic data received by the seismic sensors, using an analog-to-digital converter. The seismic data that are received are stored in a memory, which may for example be a flash memory.

In step 102, this internal PPS is calibrated to an external reference signal or PPS, which may for example be provided by a global positioning system or GPS, in the knowledge that, when the node is on a seismic surveying vessel, it is generally connected to a GPS receiver.

This synchronization or calibration operation may be performed by the microcontroller sending a reset signal to the clock.

After synchronization, there is no longer a phase difference between the internal and external PPS.

At the end of this first phase, the node is deployed and the seismic data collection mission takes place for a certain number of days, weeks or even months, the clock operating continuously during the mission.

In the example of seismic data collection at sea, since the GPS signal is electromagnetic, it does not pass through the water column. It therefore remains inaccessible to the clock. The GPS signal may also be inaccessible when collecting seismic data on land.

Over time, the instantaneous frequency error of the clock leads to an accumulated phase error between the internal PPS and the external PPS. Specifically, the electronics timestamp the seismic data by way of a signal that is supposed to have a constant frequency of 1 Hz in the example described here, but this is not the case in practice since the temperature instability and the ageing of quartz oscillators (TCXO, MCXO or OCXO) and atomic oscillators (rubidium or cesium) is non-negligible.

The accumulated phase error may be measured when the external PPS is available, that is to say, in the example of a mission at sea, when the node is brought back on board the seismic surveying vessel and reconnected to the GPS receiver.

Thus, in a second phase, which takes place at the end of the seismic data collection mission, in a step 104, the final instantaneous frequency $f_f$ of the clock, as well as the final phase offset between the internal PPS and the external PPS, are measured.

As a variant, this second phase may take place at a predetermined instant in time during the mission, in which case the instantaneous frequency of the clock at this instant in time, as well as the phase offset at this instant in time between the internal PPS and the external PPS, are measured.

In step 12 of applying the predetermined non-linear law of variation of the instantaneous frequency of the clock, the final instantaneous frequency error of the clock is estimated based on the initial $f_i$ and final $f_f$ instantaneous frequencies and the final phase offset.

To do this, according to the invention, it is hypothesized that the instantaneous frequency of the clock varies according to a 2nd-order polynomial equation, from which it follows that the phase of the clock varies according to a 3rd-order polynomial equation; a higher order of the polynomial could be adopted.

Let $\varepsilon(t)$ be the instantaneous frequency error of the clock as a function of time t. The 2nd-order polynomial equation is written as follows:

$$\varepsilon(t) = \varepsilon_i + \alpha \cdot t + \beta \cdot t^2$$

where $\varepsilon_i = \varepsilon(0)$ denotes the initial frequency error and $\alpha$ and $\beta$ denote predetermined coefficients.

The accumulated phase error is given by:

$$\varphi(t) = \int \varepsilon(t) dt$$

The accumulated phase error is therefore given by the following 3rd-order polynomial equation:

$$\varphi(t) = \varepsilon_i \cdot t + \alpha \cdot \frac{t^2}{2} + \beta \cdot \frac{t^3}{3}$$

Let T be the end instant in time of the mission. The final instantaneous frequency error and the final phase error measured at the instant in time T are denoted:

$\varepsilon(T) = \varepsilon_f$ $\varphi(T) = \varphi_f$

It is then possible to calculate the coefficients α and β, given that there are two equations with two unknowns:

$$\beta = \frac{\varphi_f - \frac{T}{2}(\varepsilon_f + \varepsilon_i)}{\left(\frac{1}{3} - \frac{1}{2}\right) \cdot T^3}$$

$$\alpha = \frac{\varepsilon_f - \varepsilon_i - \beta \cdot T^2}{T}$$

These coefficients may be calculated either in the node or in post-processing, in a separate computer.

This embodiment, for which the time drift of the clock is described according to a 3rd-order equation, is possible only if the node has a means for precisely measuring the instantaneous frequency of its clock.

Estimating the time drift of the clock using a cubic equation makes it possible to reduce the maximum error in dating the seismic samples with respect to a 2nd-order or parabolic equation.

Specifically, using an 2nd-order equation is based on the assumption that the frequency evolves linearly over time. However, the ageing phenomenon of clocks causes the frequency to vary according to a non-linear law.

Figure 5:
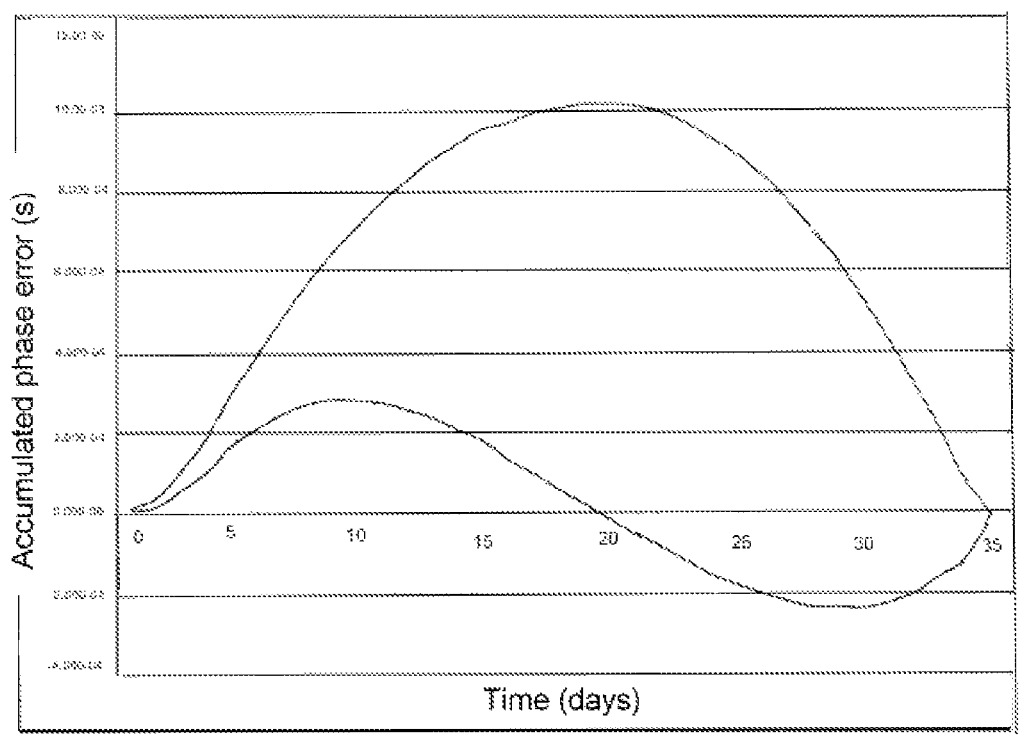
FIG. 5 is a graph showing the accumulated phase error as a function of time, in the case of a 2nd-order correction and in the case of a 3rd-order correction.

Thus, as shown in FIG. 5, which shows the accumulated phase error (in seconds) as a function of time (in days), the residual error in dating the seismic samples has a bell shape when the applied correction is 2nd-order, with the maximum error in the middle of the mission (top curve in FIG. 5).

This phenomenon is eliminated when using a cubic equation (bottom curve in FIG. 5), thereby minimizing the maximum dating error.

As a variant, instead of a law of variation of the frequency based on a polynomial equation, it is possible to use other forms of evolution, such as for example a logarithmic evolution.

Before deploying the node, it is possible to reduce the instantaneous frequency error of the clock by performing a preliminary step of adjusting the output frequency of the clock so as to reduce the instantaneous frequency error of the clock.

This step may be performed either at the time when the clock is manufactured or during maintenance of the clock. Off-the-shelf clocks specifically have an input allowing this calibration. This makes it possible to further minimize the residual clock dating error.

In order to take into account temperature changes that may occur in particular at the start or at the end of the mission, due to the deployment or return on board of the node and of the associated electronics in or from cold water, for example in the case of a mission at sea, it is possible to improve the estimate of the clock drift by introducing a temperature parameter. Specifically, taking into account the temperature in the estimate of the clock drift makes it possible to improve the accuracy of this estimate.

To this end, before deploying the node for a seismic data collection mission, the evolution of the instantaneous frequency of the clock is measured as a function of the temperature of the clock. Then, during the mission, the temperature of the clock is measured.

A parameter $\varepsilon_{Temp}$ representative of the instantaneous clock frequency error due to the change in temperature is then introduced into the law of non-linear variation of the instantaneous frequency of the clock. The 3rd-order polynomial equation giving the accumulated phase error of the clock then becomes:

$$\varphi(t) = (\varepsilon_i + \varepsilon_{Temp}) \cdot t + \alpha \cdot \frac{t^2}{2} + \beta \cdot \frac{t^3}{3}$$

where $$\beta = \frac{\varphi_f - \frac{T}{2}(\varepsilon_f + \varepsilon_i)}{\left(\frac{1}{3} - \frac{1}{2}\right) \cdot T^3}$$

$$\alpha = \frac{\varepsilon_f - \varepsilon_i - \beta \cdot T^2 - 2 \cdot \varepsilon_{Temp}}{T}$$

Figure 3:
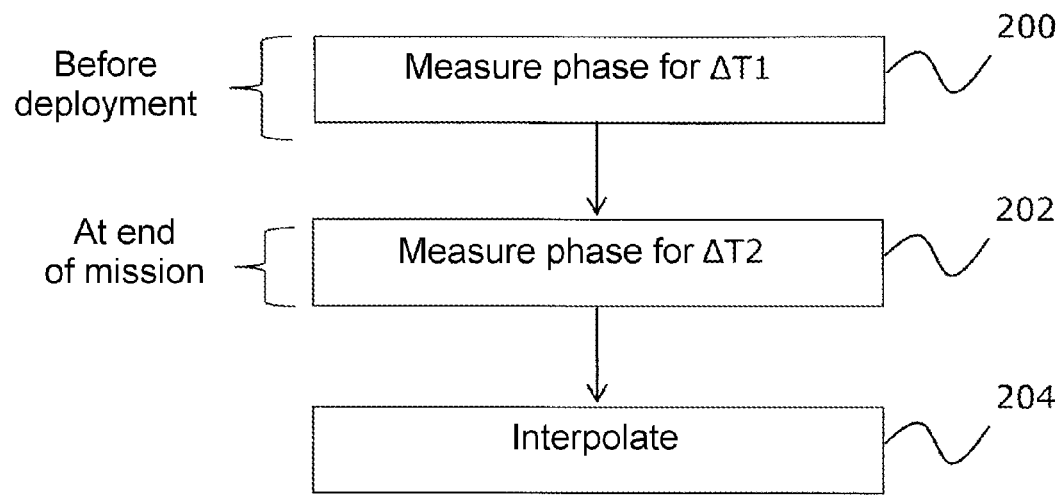
FIG. 3 is a flowchart illustrating steps of the method of FIG. 1 in a second particular embodiment in which the physical operating parameter is the phase of the clock.

FIG. 3 illustrates the progress of the method according to the invention in a second embodiment, in which the physical operating parameter of the clock that is used is not the instantaneous frequency but the phase of the clock.

In this embodiment, the measurement step 10 takes place in two stages.

First of all, before the node is deployed for a seismic data collection mission, the phase of the clock is measured continuously for a predetermined period of time ΔT1 in a step 200 so as to ascertain the evolution of the accumulated phase error during this period ΔT1.

Then, at the end of the mission, the phase of the clock is again measured continuously for a predetermined period of time ΔT2 in a step 202 so as to ascertain the evolution of the accumulated phase error during this period ΔT2.

Next, in a step 204, the accumulated phase error during the mission, that is to say between the two periods ΔT1 and ΔT2, is estimated using an interpolation method such as for example the spline method, a spline being a function defined piecewise by polynomials. This interpolation method is known per se. This example is not limiting: another interpolation method could be used.

This embodiment is advantageous in that it does not require measuring the instantaneous frequency of the clock. It may therefore be implemented using electronics that are even simpler than in the first embodiment.

Figure 4:
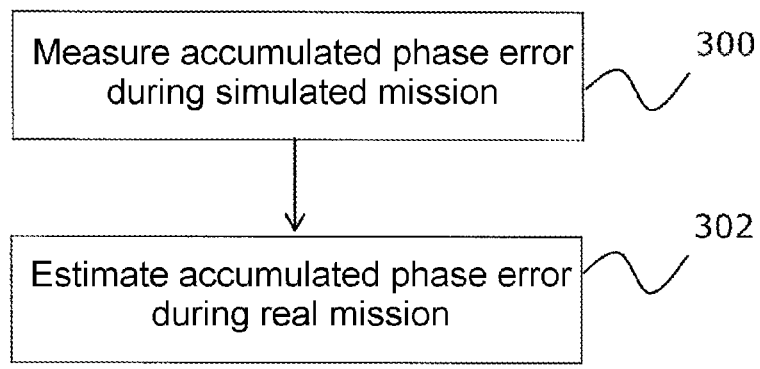
FIG. 4 is a flowchart illustrating steps of the method of FIG. 1 in a third particular embodiment including a simulated mission.

In a third embodiment, illustrated in FIG. 4, prior to the mission, the accumulated phase error during a simulated seismic data collection mission is measured in a step 300, in production or in maintenance, at various temperatures. This constitutes a form of calibration. The law described above is then applied in order to estimate the accumulated phase error during a real mission, in a step 302.

The system for estimating the drift over time of the clock according to the invention may comprise an electronic or computerized module, either on board the node or remote in a processor or computer or separate electronic circuit, capable of measuring the frequency error and/or phase error of the clock at the start and at the end of the mission, thereby making it possible to estimate the accumulated phase error according to a 3rd-order polynomial, whereas conventional equipment is capable only of measuring the phase drift and therefore of estimating the accumulated phase error according to a 1st-order polynomial.

More particularly, the abovementioned module is configured so as to perform the steps described above in connection with FIGS. 1 to 4. When the module is embedded in the node, it may consist of a unit separate from the functional units that are already present in the node, such as the microcontroller of the node, or else it may be functionally integrated into such units. By way of example, the microcontroller of the node is configured so as to further perform at least some of the steps described above in connection with FIGS. 1 to 4.

The invention claimed is:

1. A method for estimating a drift over time of a variable physical operating parameter of a clock for dating samples of seismic data, associated with a seismic data collection node, said method comprising the steps of:

inserting a clock into a seismic data collection node that assigns a date to a seismic data, relating to at least one seismic event, collected by said seismic data collection node;

at least one variable physical operating parameter associated with said clock is measured in a measurement step, at predetermined instants in time or for predetermined periods of time; and a predetermined non-linear law of variation of said variable physical operating parameter, which depends on values of said at least one variable physical operating parameter collected in said measurement step, is applied to said variable physical operating parameter so as to obtain an estimate of said drift over time of said variable physical operating parameter, and wherein, in said measurement step:

before deploying said seismic data collection node for a seismic data collection mission, an initial instantaneous frequency of said clock is measured, and an internal time information signal of said node is synchronized with respect to a reference time information signal;

at a predetermined instant in time during said seismic data collection mission, a final instantaneous frequency of said clock and a phase offset between said internal time information signal of said seismic data collection node and said reference time information signal are measured;

and wherein, in said step of applying said predetermined non-linear law of variation of said variable physical operating parameter, an instantaneous frequency error of said clock is estimated based on said initial instantaneous frequency, said instantaneous frequency at said predetermined instant in time and said phase offset, and wherein, according to said predetermined non-linear law of variation of said variable physical operating parameter, said instantaneous frequency varies according to a polynomial equation of order greater than or equal to 2, such that a phase of said clock varies according to a polynomial equation of order greater than or equal to 3.

2. The method as claimed in claim 1, wherein, in a preliminary step, an output frequency of said clock is adjusted so as to reduce said instantaneous frequency error of said clock.

3. The method as claimed in claim 1, wherein said reference time information signal is provided by a GPS location system.

4. The method as claimed in claim 1, wherein:

before deploying said node for a seismic data collection mission, an evolution of said variable physical operating parameter is furthermore measured as a function of a temperature of said clock;

during said seismic data collection mission, said temperature of said clock is measured; and said predetermined non-linear law of variation of said variable physical operating parameter takes into account said temperature.

5. The method as claimed in claim 1, wherein said predetermined instant in time during said seismic data collection mission corresponds to an end of said seismic data collection mission.

6. The method as claimed in claim 1, wherein, according to said predetermined non-linear law of variation of said variable physical operating parameter, said instantaneous frequency varies according to a 2nd-order polynomial equation, such that said phase of said clock varies according to a 3rd-order polynomial equation.

7. The method as claimed in claim 1, wherein said seismic data collection node is designed for use on a seabed.

8. A system for estimating a drift over time of a variable physical operating parameter of a clock for dating samples of seismic data, associated with a seismic data collection node, wherein said system comprises:

a module designed to implement steps of the method as claimed in claim 1.

9. The method as claimed in claim 2, wherein said preliminary step is performed during a phase of manufacturing said clock.

10. The method as claimed in claim 2, wherein said preliminary step is performed during a phase of maintaining said clock.

11. A method for estimating a drift over time of a variable physical operating parameter of a clock for dating samples of seismic data, associated with a seismic data collection node, said method comprising the steps of:

inserting a clock into a seismic data collection node that assigns a date to a seismic data, relating to at least one seismic event, collected by said seismic data collection node;

at least one variable physical operating parameter associated with said clock is measured in a measurement step at predetermined instants in time or for predetermined periods of time; and a predetermined non-linear law of variation of said physical operating parameter variable, which depends on values of said at least one variable physical operating parameter collected in said measurement step, is applied to said variable physical operating parameter so as to obtain an estimate of said drift over time of said variable physical operating parameter, and wherein, in said measurement step, a phase of said clock is measured for a first predetermined period of time before deploying said node for a seismic data collection mission and for a second predetermined period of time at an end of said seismic data collection mission and, in said step of applying said law, an interpolation method is used so as to obtain an estimate of an accumulated phase error of said clock, and wherein, according to said predetermined non-linear law of variation of said variable physical operating parameter, a phase of said clock varies according to a polynomial equation of order greater than or equal to 3.

12. The method as claimed in claim 11, wherein, in said measurement step, said accumulated phase error of said clock is measured for a period of time corresponding to a simulated seismic data collection mission.

13. The method as claimed in claim 11, wherein said phase of said clock varies according to a 3rd-order polynomial equation.

14. The method as claimed in claim 11, wherein said seismic data collection node is designed for use on a seabed.

15. The method as claimed in claim 12, wherein:
before deploying said seismic data collection node for a seismic data collection mission, an evolution of said variable physical operating parameter is furthermore measured as a function of a temperature of said clock;
during said seismic data collection mission, said temperature of said clock is measured.

\* \* \* \* \*